A. FAY.
MECHANICAL MOVEMENT.
APPLICATION FILED OCT. 10, 1910.

1,149,816.

Patented Aug. 10, 1915.
14 SHEETS—SHEET 1.

WITNESSES:

INVENTOR.

A. FAY.
MECHANICAL MOVEMENT.
APPLICATION FILED OCT. 10, 1910.

1,149,816.

Patented Aug. 10, 1915.
14 SHEETS—SHEET 6.

WITNESSES:

INVENTOR.

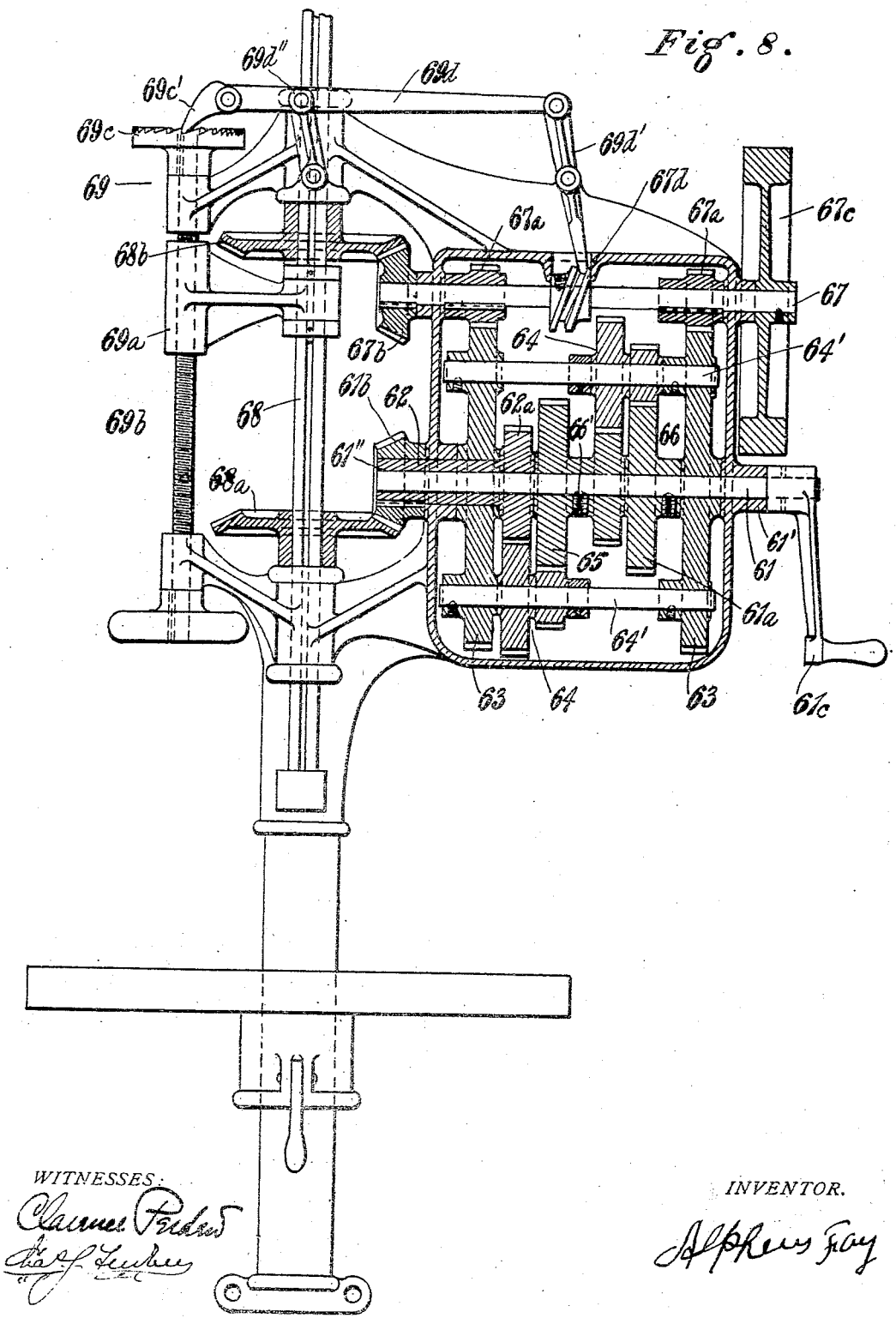

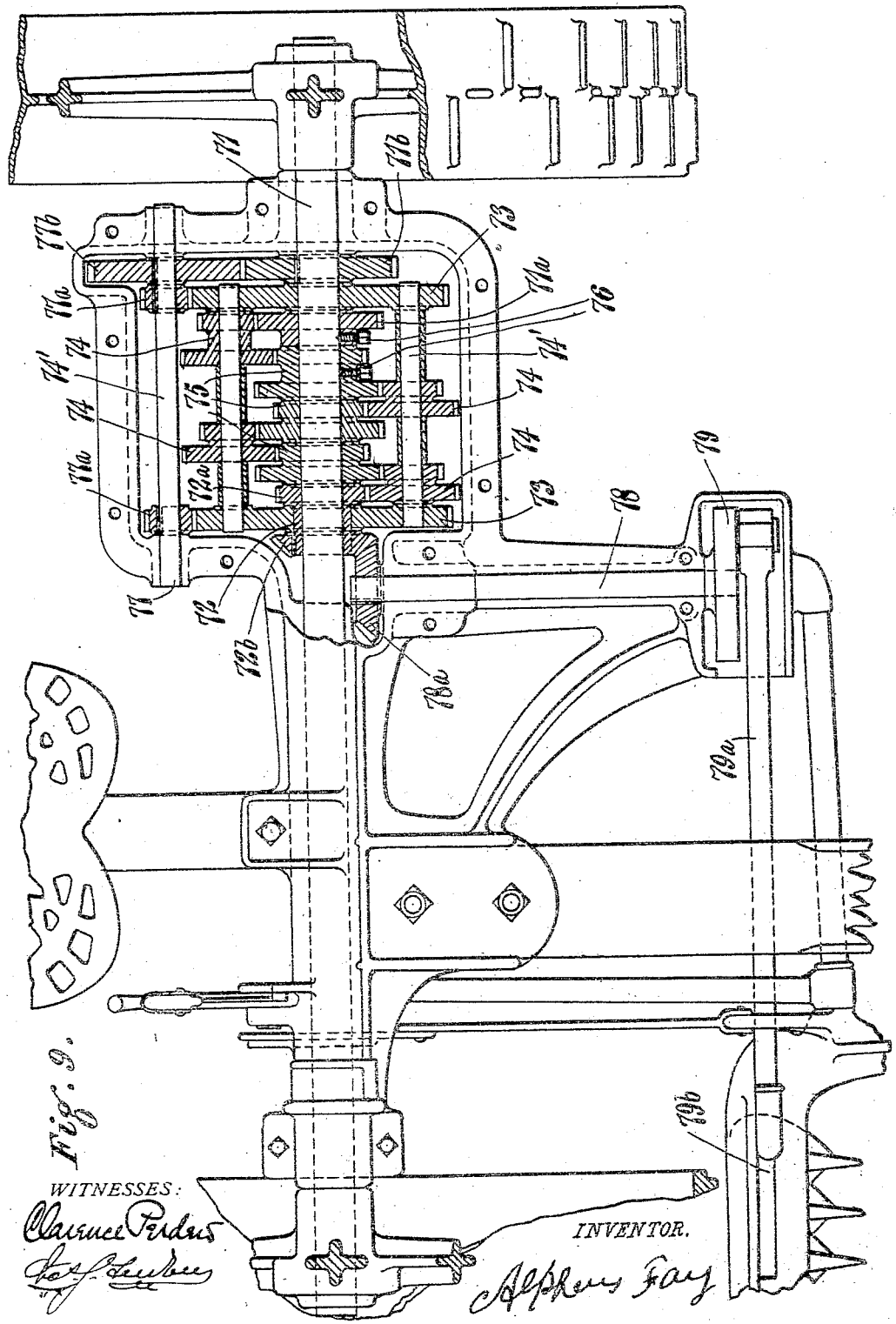

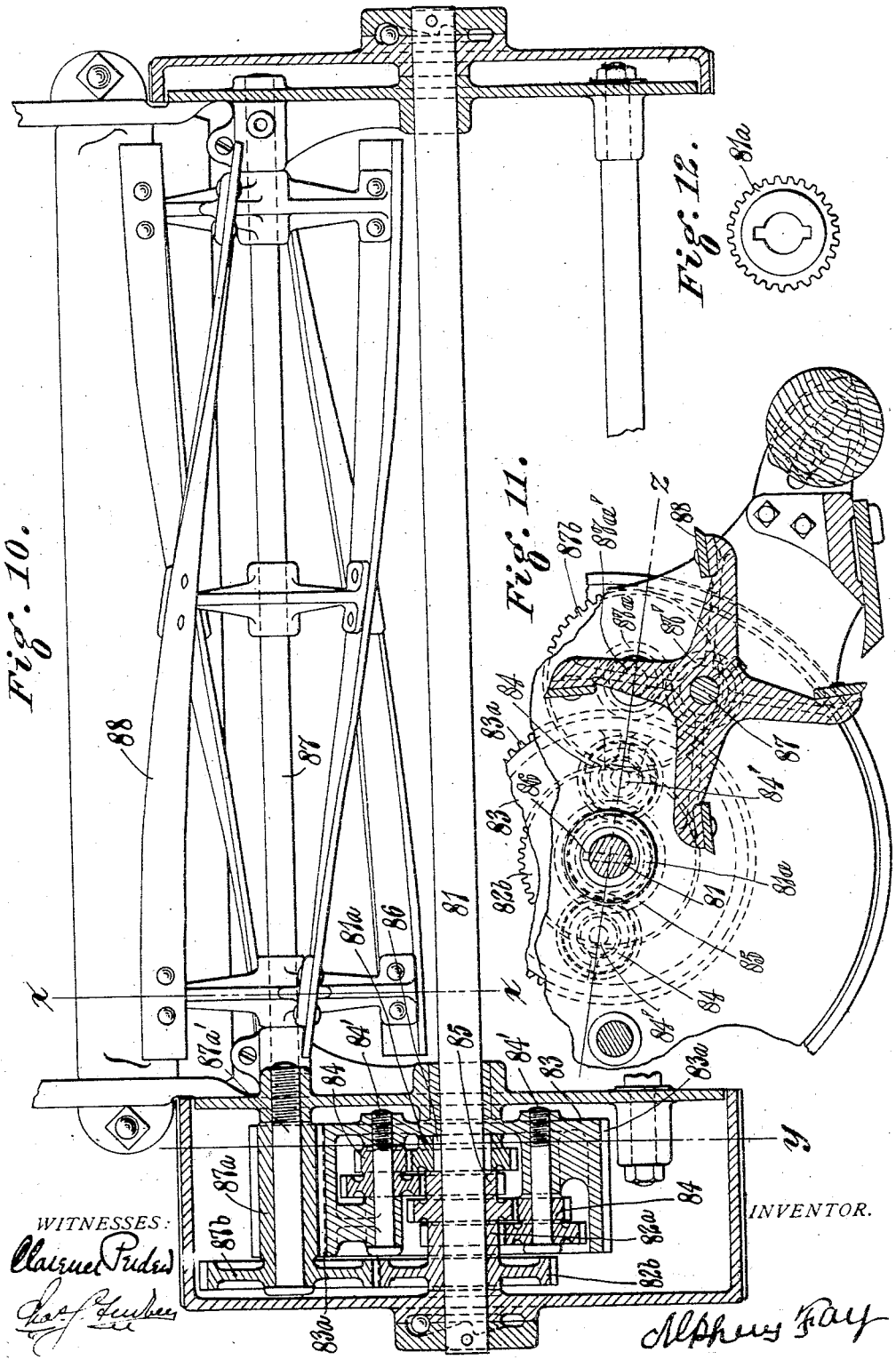

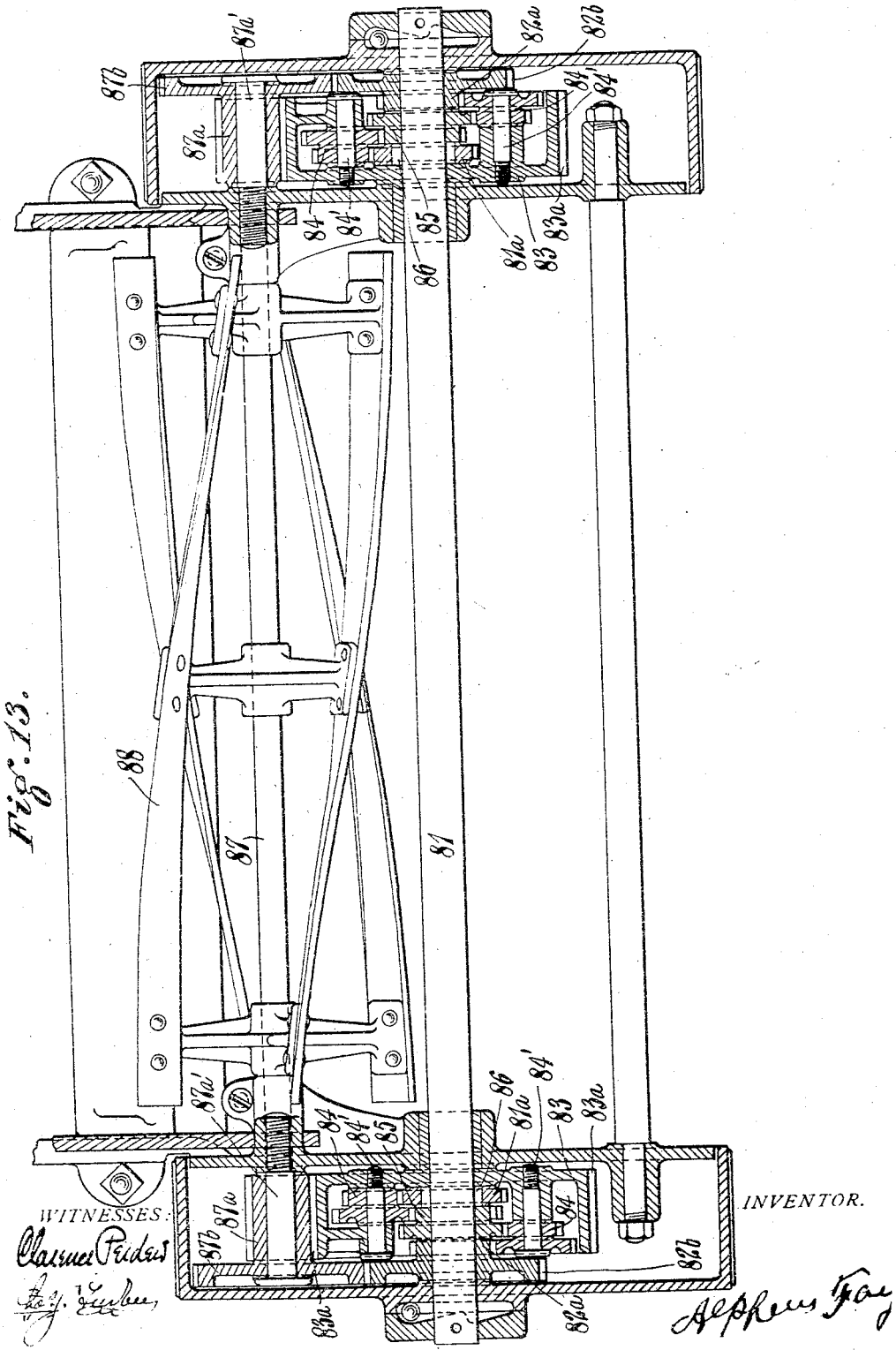

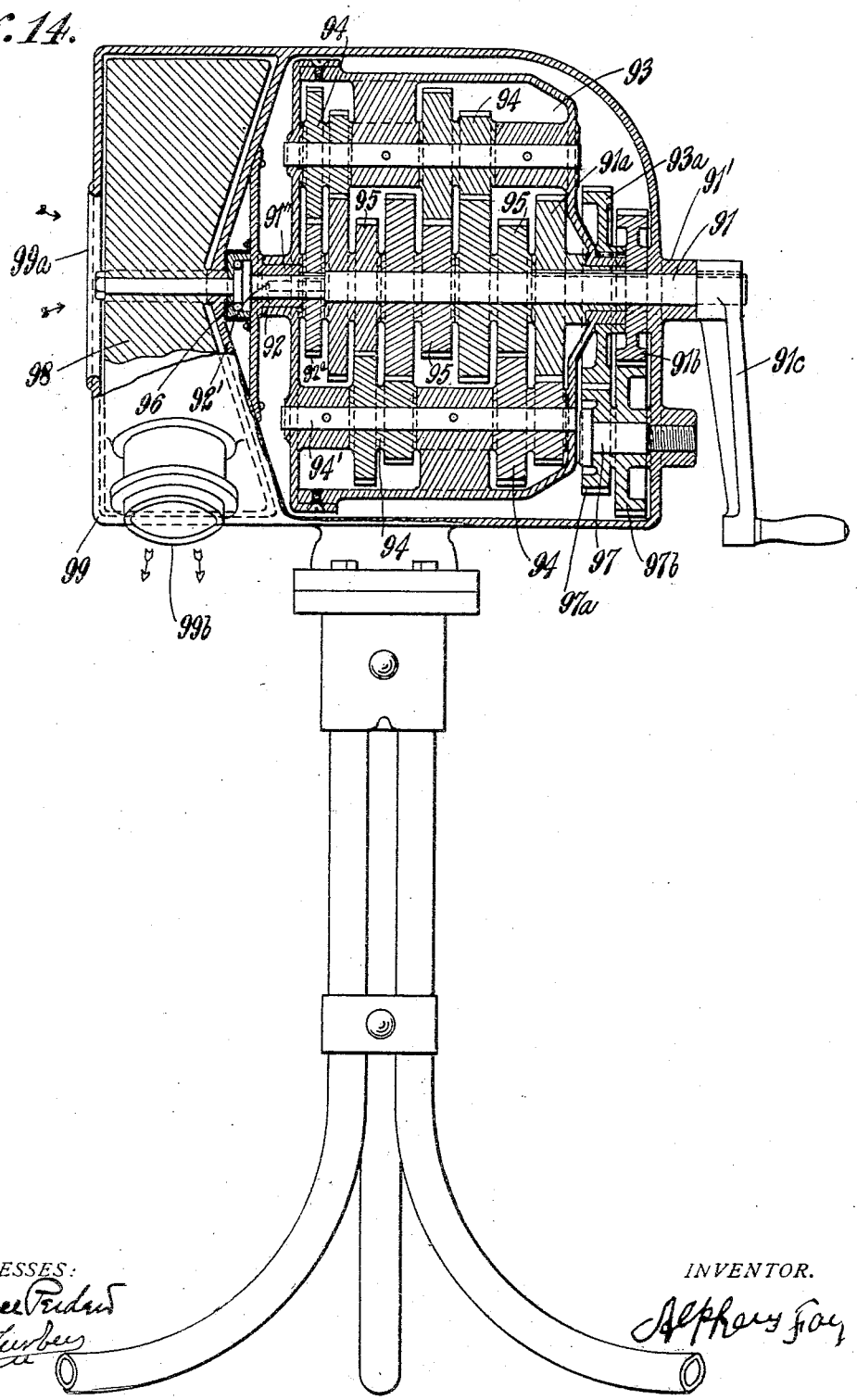

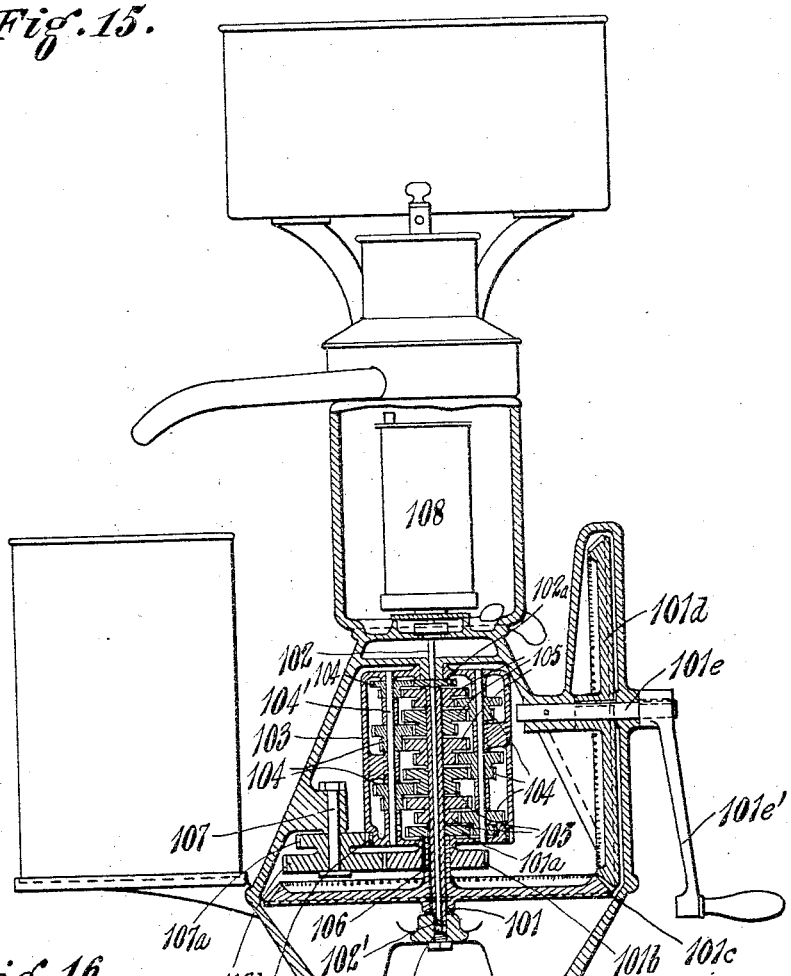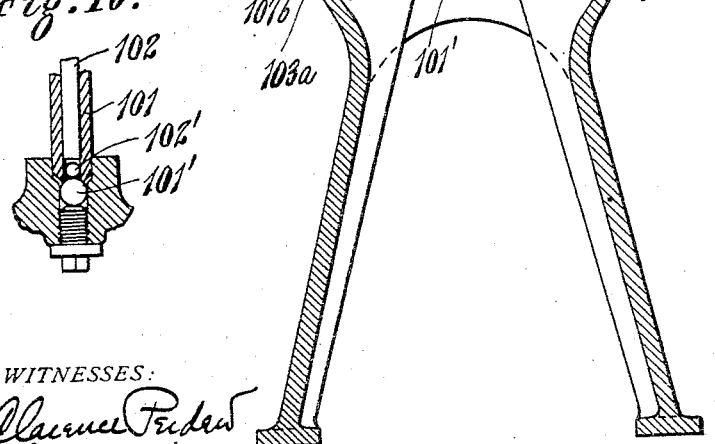

A. FAY.
MECHANICAL MOVEMENT.
APPLICATION FILED OCT. 10, 1910.
1,149,816.
Patented Aug. 10, 1915.
14 SHEETS—SHEET 13.
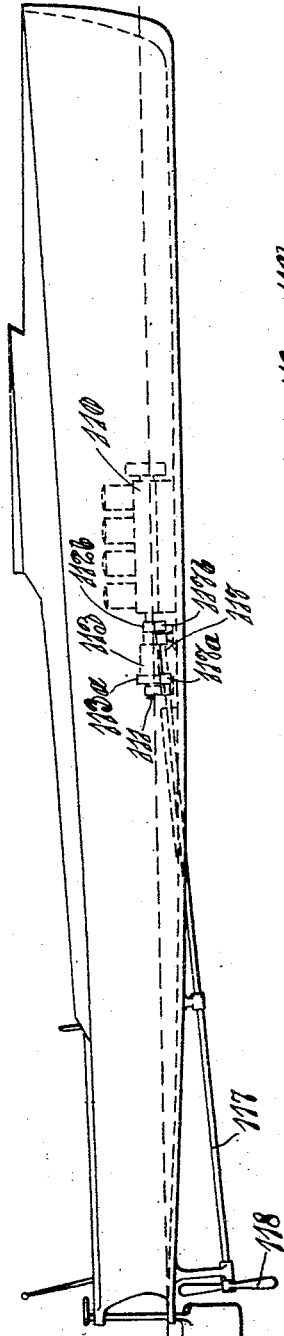
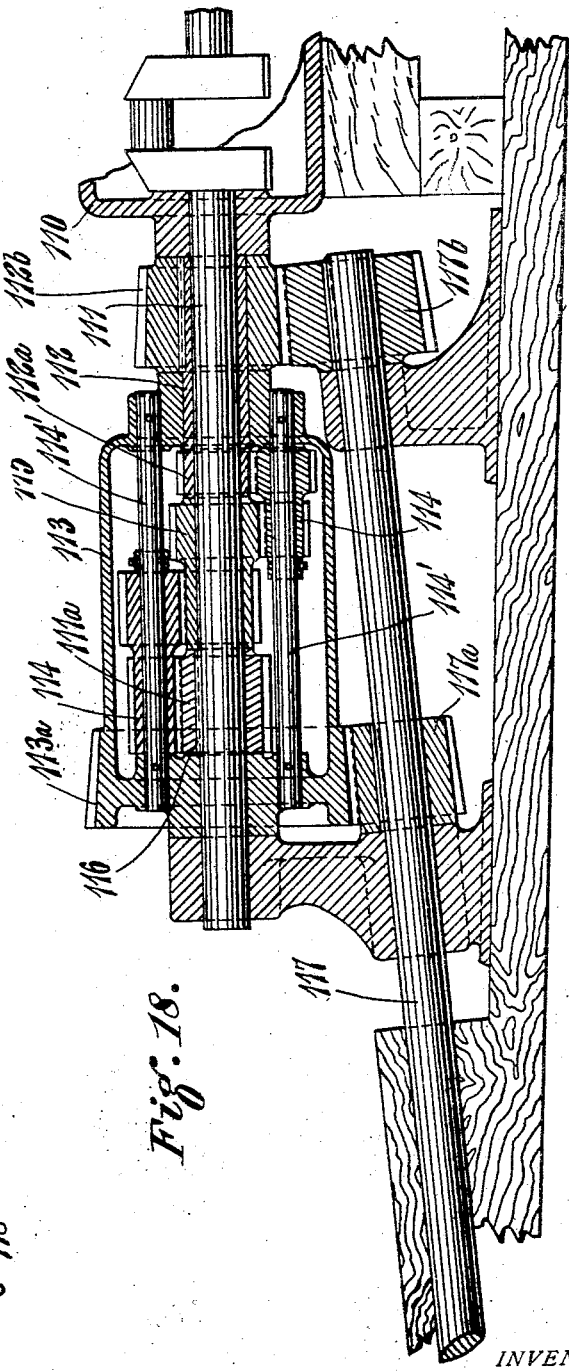
WITNESSES:
INVENTOR.
Alpheus Fay

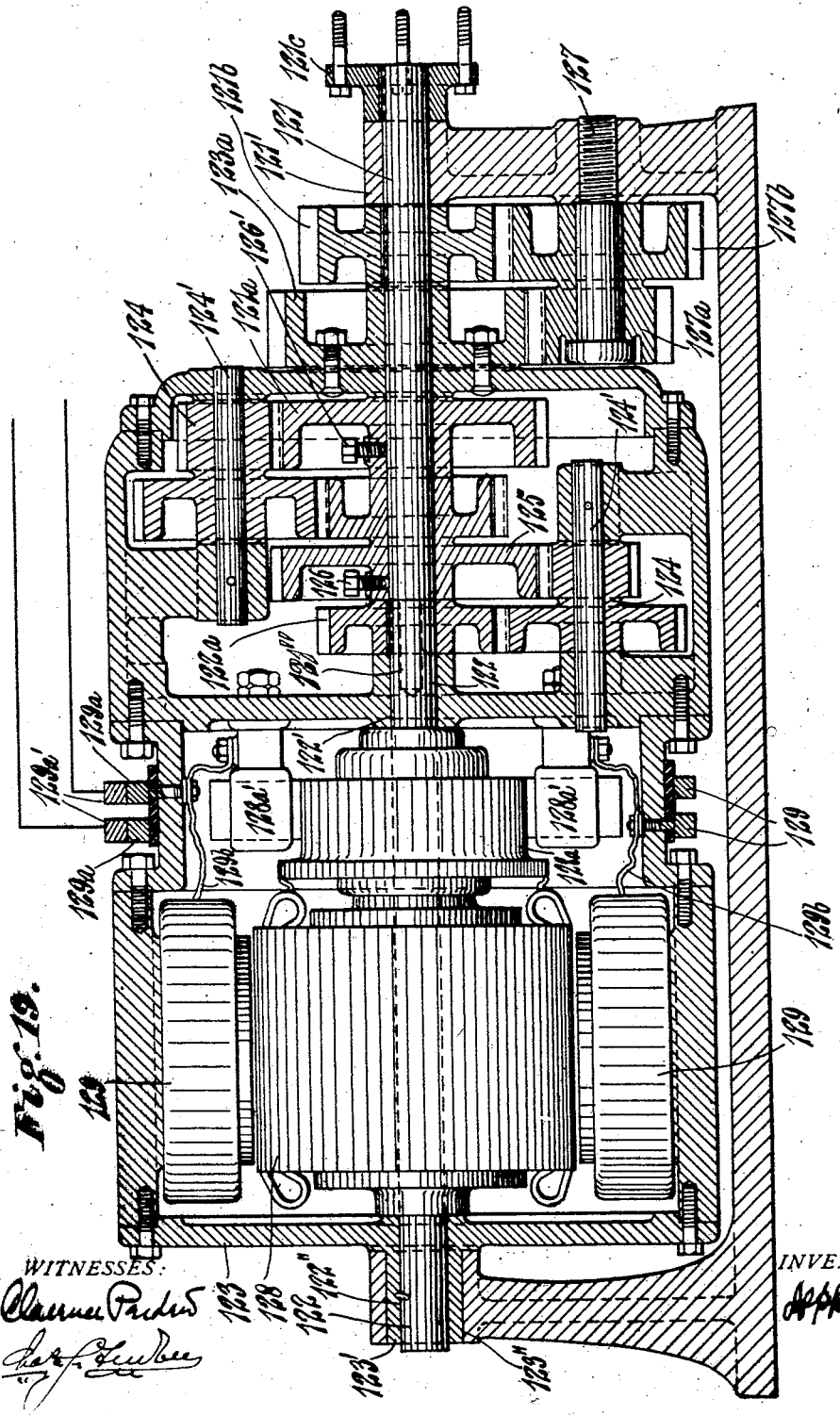

UNITED STATES PATENT OFFICE.

ALPHEUS FAY, OF LOUISVILLE, KENTUCKY.

MECHANICAL MOVEMENT.

1,149,816.

Specification of Letters Patent.

Patented Aug. 10, 1915.

Application filed October 10, 1910. Serial No. 586,416.

*To all whom it may concern:*

Be it known that I, ALPHEUS FAY, a citizen of the United States, residing at Louisville, in the county of Jefferson and State of Kentucky, have invented a certain new and useful Mechanical Movement, of which the following is a specification.

My invention relates to machine elements, and has for its object the utilization of the reaction incident to differential power transmission mechanism, whereby the efficiency of said transmission mechanism is raised, and whereby the efficiency is maintained uniform at all ratios of change of speed.

My invention consists in the combination with the driving member and the driven member and operative connection therebetween, of means for utilizing the reaction of said connection, as will hereinafter be more fully described and claimed.

Figure 1:
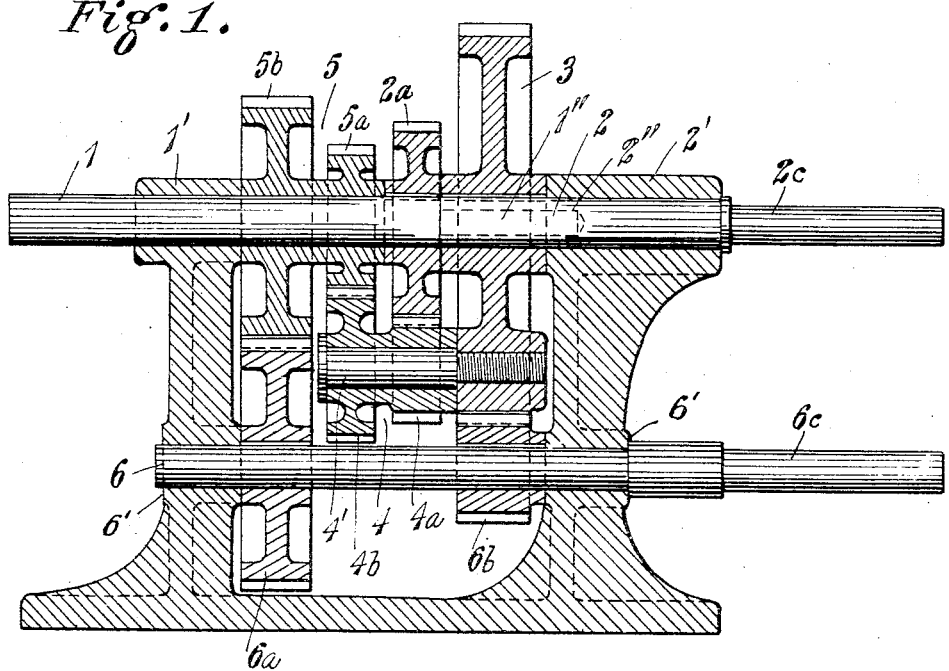
Figure 2:
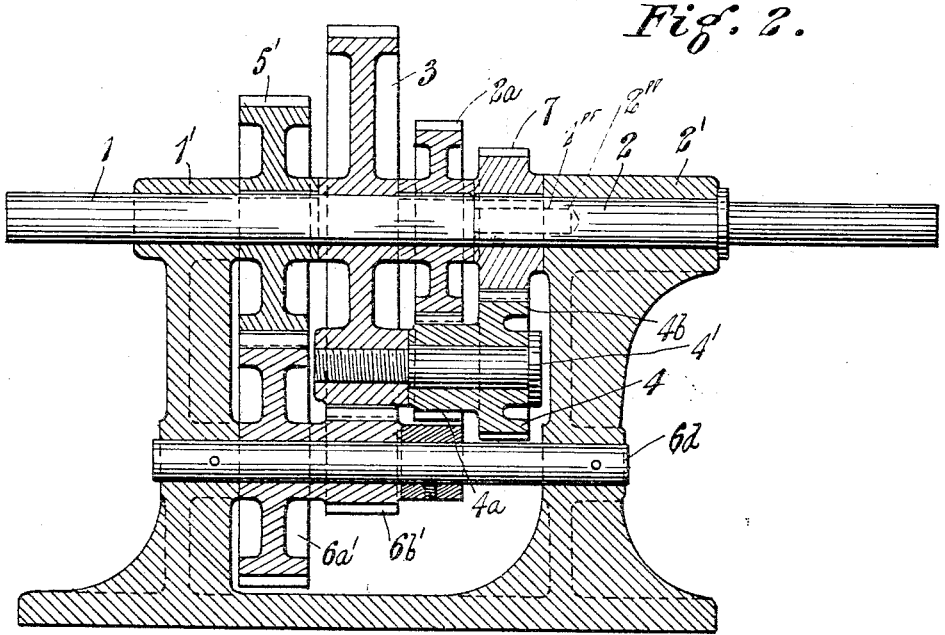
Figure 3:
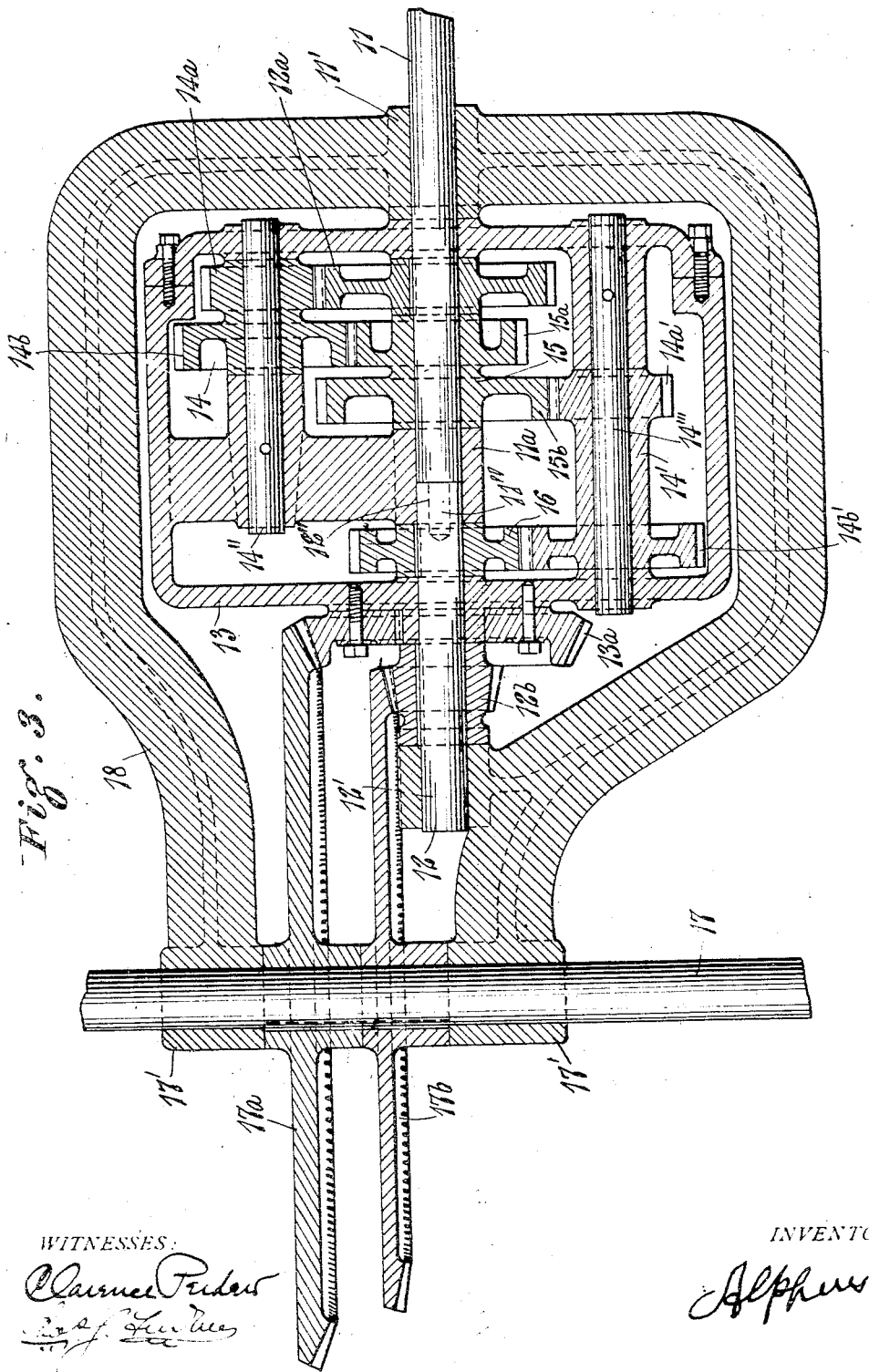
Figure 4:
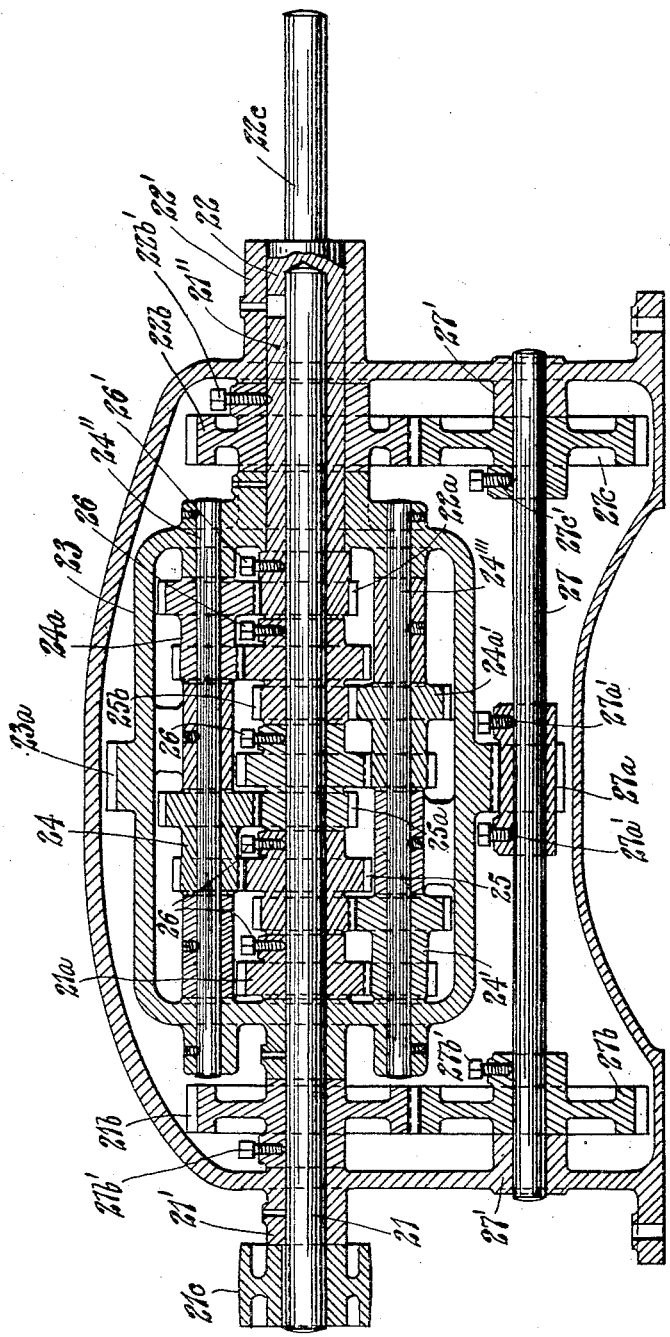
Figure 5:
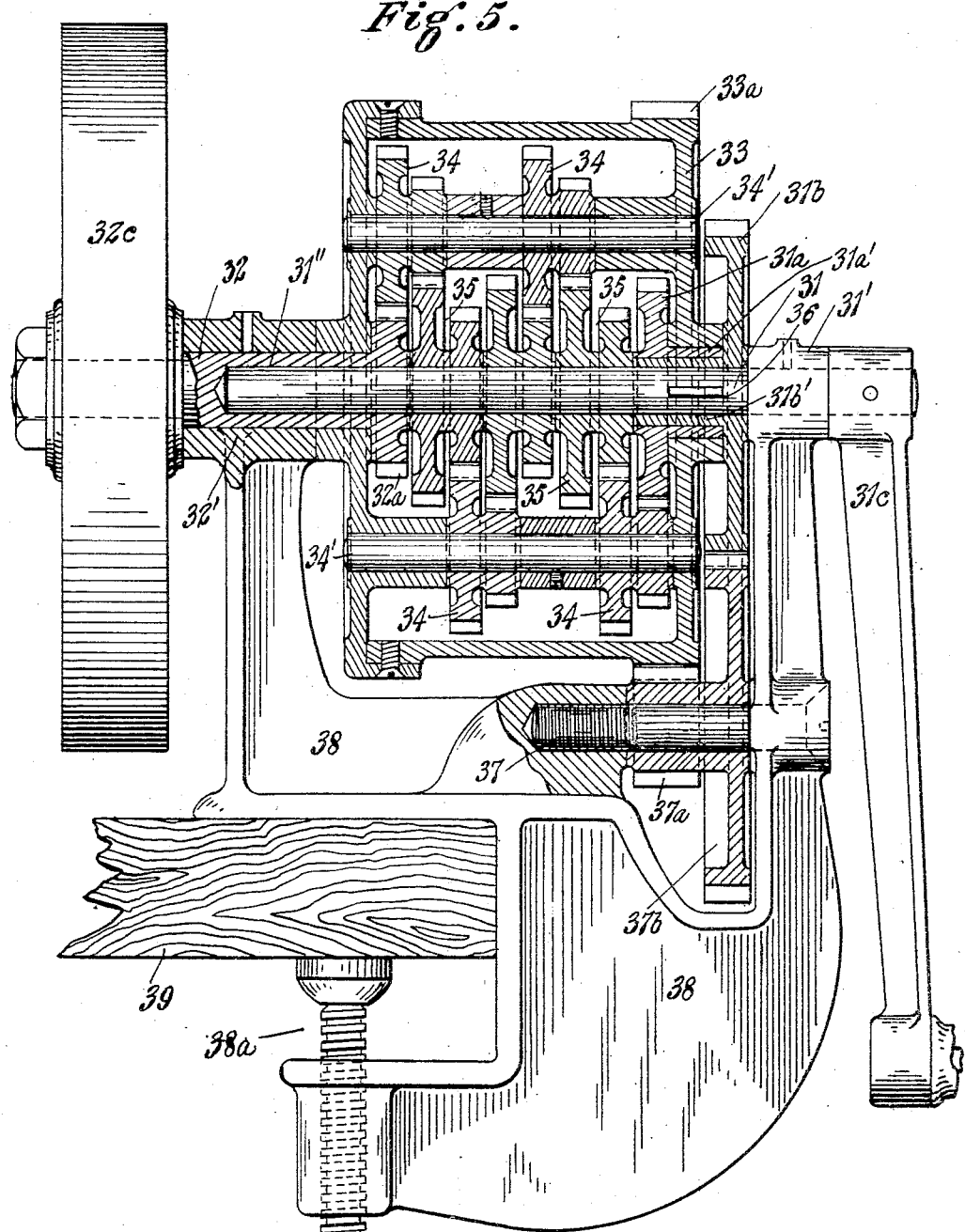
Figure 6:
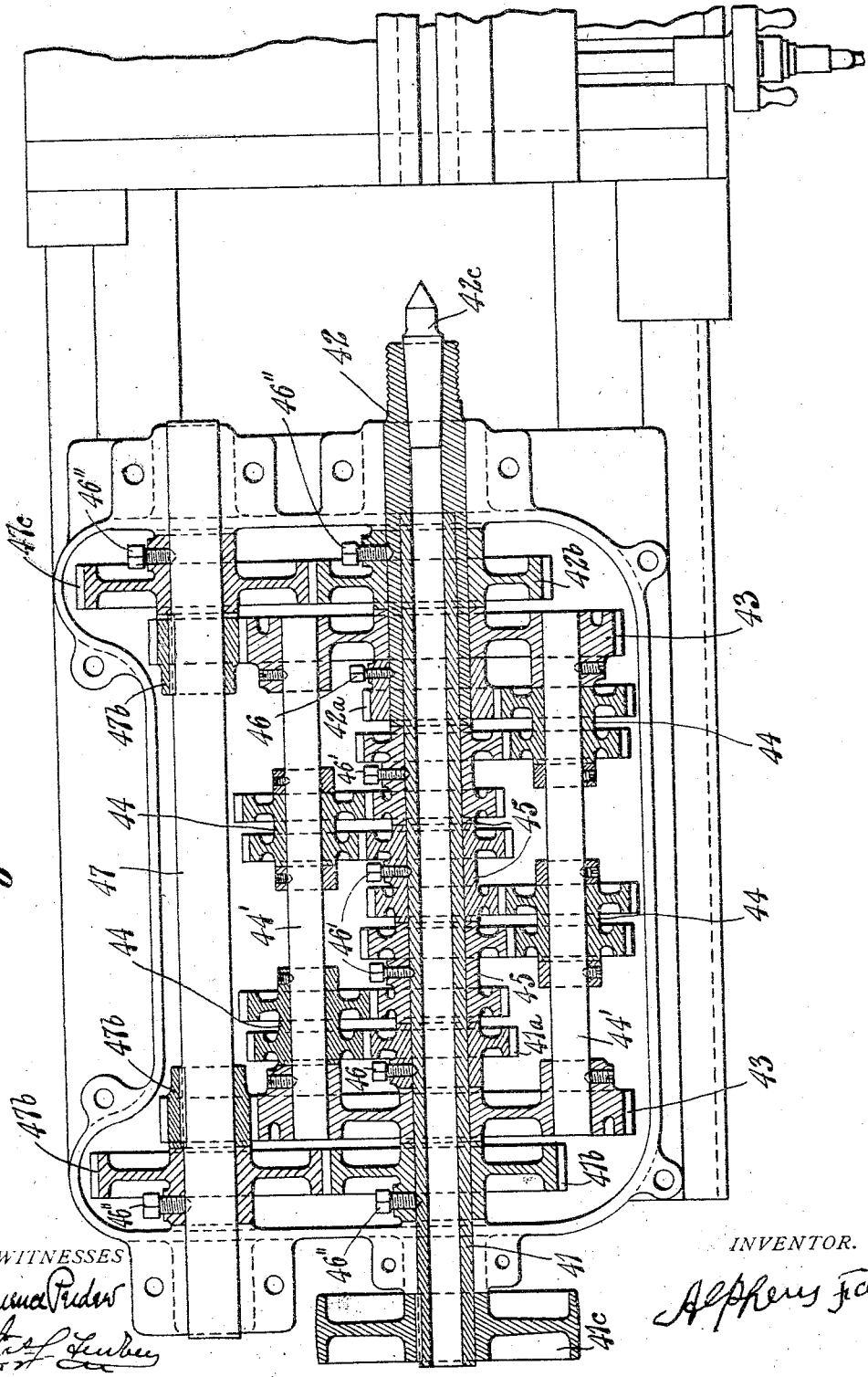
Figure 7:
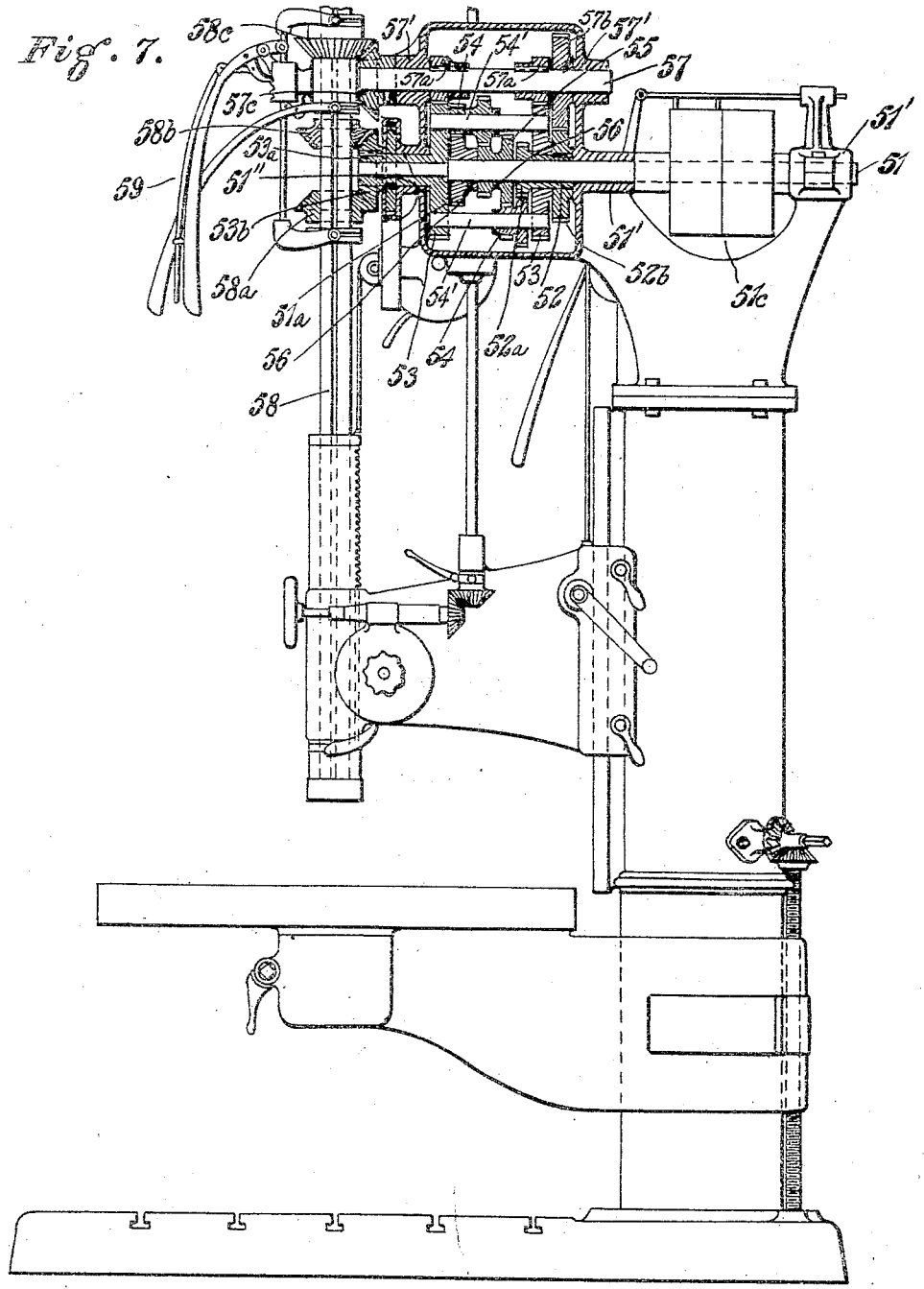

In the drawings: Figure 1 illustrates a simple embodiment of my invention, wherein the reaction is utilized to assist in the driving of the driven member by acting directly thereon. Fig. 2 is a similar illustration of the device in which the reaction is utilized to act directly upon the driving member and thereby assist in driving the driven member. Fig. 3 illustrates a modification in which the intermediate shaft on which the reaction is utilized becomes the shaft with which the work is performed. Fig. 4 illustrates a device in which the reaction may be utilized, acting either directly upon the driving shaft or directly upon the driven shaft, and also by means of which the ratio between the speed of the driving shaft and that of the driven shaft may be changed. Fig. 5 illustrates my invention applied to a grinding machine adapted to be driven by hand. Fig. 6 illustrates the application of my invention to a lathe, with means for obtaining various changes of speed thereon. Fig. 7 illustrates the application of my invention to an upright drill of heavy construction, adapted to be operated by power, and having means in conjunction therewith for reversing the direction of rotation of the spindle. Fig. 8 illustrates the application of my invention to an upright drill of lighter construction, adapted to be driven by hand, and having an automatic feeding device operating in conjunction therewith. Fig. 9 illustrates the application of my invention to a mowing machine, with provision for changing the speed at which the cutter-bar is operated. Fig. 10 is a sectional plan view of a lawn mower with my invention applied thereto, the driving being effected through the wheel on one side only, the section being taken on the line $z$ of Fig. 11. Fig. 11 is a vertical cross section on the line $x$—$x$ of Fig. 10. Fig. 12 is a detail view of the driving gear in the lawn mower. Fig. 13 is a sectional plan view of a lawn mower with my invention applied thereto, the driving being effected through both wheels thereof. Fig. 14 illustrates the application of my invention to a centrifugal blower to be operated by hand. Fig. 15 illustrates the application of my invention to a cream separator, the part of the machine in which my invention is embodied being shown in vertical cross section, while the remainder of the machine is shown in front elevation. Fig. 16 is an enlarged detail sectional view of the ball bearings for the vertical shafts in the cream separator. Fig. 17 is a side elevation of a motor boat equipped with my invention as a means for driving the propeller. Fig. 18 is a vertical longitudinal section of the part of the boat containing my invention. Fig. 19 is a vertical longitudinal section of a device illustrating the application of my invention to a dynamo electric machine, whereby the machine may be driven at a high speed by an engine or other motive apparatus operating at a lower speed, provision being made for changing the speeds thereof.

The principle of my invention may be understood by reference to Figs. 1 and 2 of the drawings. In Fig. 1 the driving shaft 1 and the driven shaft 2 are in alinement. The driven shaft 2 has a bearing 2′, while the driving shaft 1 has a bearing 1′, and also has a reduced portion 1″ bearing in a central opening 2″ in the driven shaft 2. The driving gear 2ª is keyed on the driving shaft 1, and the reactive gear 3 is keyed on the driven shaft 2, these two gears being adjacent to each other. The reactive gear 3 carries the stepped gear 4, mounted on a stud 4′ therein, said stud being parallel to the driving shaft 1 and the driven shaft 2, so that the stepped gear 4 is planetary with respect to said shafts. The smaller member 4$^a$ of the gear 4 is in mesh with the driving gear 2$^a$. The stepped gear 5 is loosely mounted on the driving shaft 1, adjacent to the bearing 1', and it has a smaller member 5$^a$ in mesh with the larger member 4$^b$ of the gear 4, that is carried on the reactive gear 3. These members 4$^b$ and 5$^a$ are of equal diameter, while the member 4$^a$ of the stepped gear carried on the reactive member is of less diameter than the driving gear 2$^a$, in such proportion as may be desired. An intermediate shaft 6 is journaled in bearings 6' and carries a gear 6$^a$ rigidly mounted thereon, which is in mesh with the larger member 5$^b$ of the gear 5, that is loosely mounted on the driving shaft 1. This intermediate shaft 6 also has a pinion 6$^b$ rigidly mounted thereon, and this pinion is in mesh with the reactive gear 3 that is rigidly mounted on the driven shaft 2. As shown, the driven shaft has a reduced portion 2$^c$, to which any form of operative member may be attached for performing work while the intermediate shaft 6 also has a similar reduced portion 6$^c$ for the same purpose, and work may be performed either with the driven shaft 4$^a$ or with the intermediate shaft 6$^c$. In either instance the reaction on the gearing incident to the causing of a difference of speed between the driven shaft and the driving shaft will be utilized to virtually assist the motive apparatus employed, thereby providing a balanced action. This dispenses with stationary reaction, and I have found, in practice, that this reduces the energy necessary to perform the work with either the driven shaft or the intermediate shaft. If the work be done with the driven shaft, the action will take place through the driving gear 2$^a$, the gears 4 and 5 and through the gear 6$^a$ and pinion 6$^b$ and the intermediate shaft 6 on which they are mounted, through the reactive member 3 and onto the driven shaft 2; at the same time any reaction will operate directly through the reactive member 3 onto the driven shaft 2. With this arrangement the teeth of the pinion 6$^b$ will be bearing forward against the teeth of the reactive gear 3, and the action and reaction will coact to perform the work imposed on the driven shaft 2. If the work be performed with the intermediate shaft 6, the action will take place from the driving gear 2$^a$ to the intermediate shaft 6, while the reaction will be transmitted from the driving gear 2$^a$ through the member 4$^a$ of the gear 4 onto the stud 4' to the reactive gear 3, and from there through the pinion 6$^b$ onto the intermediate shaft 6. In this instance the teeth of the reactive gear 3 will bear forward against the teeth of the pinion 6$^b$ on the intermediate shaft 6.

Arranged as illustrated in Fig. 2, the driving shaft 1 and the driven shaft 2 have their bearings 1' and 2' respectively, and the driving shaft 1 has its reduced portion 1" bearing in the central opening 2" in the driven shaft 2, the same as illustrated in Fig. 1. However the reactive gear 3 is here mounted loosely on the driving shaft 1 and carries the stepped gear 4 with its members 4$^a$ and 4$^b$ on the opposite side on the stud 4'. The driving gear 2$^a$ meshes with the member 4$^a$ on the gear 4, but the member 4$^b$ of said gear 4 meshes with the driven gear 7 rigidly mounted on the driven shaft 2. The stepped gear 5 is replaced by a simple gear 5' rigidly mounted on the driving shaft, and this gear meshes with the gear 6$^{a'}$ that has a pinion 6$^{b'}$ to rotate therewith loosely on the intermediate shaft 6$^d$, which is stationarily mounted as shown. The pinion 6$^{b'}$ meshes with the reactive gear 3. In this case work is done only with the driven shaft 2, it being provided with the reduced portion 2$^c$ as before described. When work is performed with this driven shaft by the rotation of the driving shaft 1, the action takes place through the driving gear 2$^a$ and the gear 4 onto the driven gear 7 and onto the driven shaft 2. The reaction takes place from the driving gear 2$^a$ onto the smaller member 4$^b$ of the gear 4, and through the stud 4' to the reactive gear 3, and from there through the pinion 6$^{b'}$ and the gear 6$^{a'}$ turning together in the intermediate shaft 6$^d$, and through the gear 5' back to the driving shaft 1. In this instance the teeth of the gear 6$^{a'}$ on the intermediate shaft 6$^d$ will press forward against the teeth of the gear 5' on the driving shaft 1, and through the assistance of the reaction thus transmitted to the driving shaft, the torque necessary on the driving shaft to perform a given amount of work with the driven shaft will be so modified that the efficiency of the machine will remain constant, notwithstanding the increased speed at which the driven shaft is driven.

As illustrated in Fig. 3, the driving shaft 11 and driven shaft 12 are in alinement, and have separate bearings 11' and 12' respectively. The driving shaft 11 has a reduced portion 11" bearing in a central opening 12" in the driven shaft 12, and both shafts have a common bearing 11$^a$ which forms part of the reactive member 13, which here takes the form of a drum, bearing at one end on the driving shaft 11 adjacent to the bearing 11' and at the other end bearing on the driven shaft 12. This reactive member or drum 13 carries stepped gears 14 and 14' turning loosely on reactive shafts 14" and 14'" respectively, which are rigidly mounted in the drum 13 parallel to and at equal distances radially from the common center line of the driving shaft 11 and driven shaft 12. The driving shaft 11 carries a driving gear 12ª that is in mesh with the smaller member 14ª of the gear 14. A gear 15 is loosely mounted on the driving shaft 11, inside the drum, and the gear 14 has its larger member 14ᵇ in mesh with the smaller member 15ª of said gear 15 on the driving shaft. The larger member 15ᵇ of the gear 15 on the driving shaft is in mesh with the smaller member 14ª′ of the gear 14′, while the driven shaft 12 is provided with a driven gear 16 that is in mesh with the larger member 14ᵇ′ on the gear 14′. The driving gear 12ª is of larger diameter than the member 14ª with which it meshes, and the member 15ᵇ is of larger diameter than the member 14ª′ with which it meshes. The members 14ᵇ and 15ª meshing together are of equal diameter, as are also the member 14ᵇ′ and the driven gear 16, which mesh together. It will thus be seen that a train of gears is provided inside the drum from the driving gear 12ª to the driven gear 16, constituting an operative connection between the driving shaft 11 and the driven shaft 12, the reaction of which is imposed upon the reactive member 13, and by means of which part of the rotary movement obtained from the driving shaft 11 will be imparted to the driven shaft 12 and part of said movement imparted to the reactive member or drum 13. A bevel pinion 12ᵇ is rigidly mounted on the driven shaft 12 outside the drum 13, and a larger bevel pinion 13ª is rigidly mounted on the drum 13 outside thereof adjacent to the bevel pinion 12ᵇ. The intermediate shaft 17 carries a larger bevel gear 17ª in mesh with the larger bevel pinion 13ª on drum 13 and this intermediate shaft also carries a smaller bevel gear 17ᵇ in mesh with the smaller pinion 12ᵇ on the driving shaft 12. Both gears are rigidly mounted on said intermediate shaft 17, and the shaft has bearings 17′, which, with the bearing 11′ and the bearing 12′, may be rigidly attached together by a suitable frame 18. With this arrangement, when the driven shaft rotates, the action will take place through the train of gears from the driving gear 12ª to the driven gear 17, and through the driven shaft 12 and the pinion 12ᵇ thereon to the gear 17ᵇ on the intermediate shaft, and from there to said intermediate shaft, while the reaction will take place through the drum 13 under the action of the stepped gears carried thereby, through the pinion 13ª thereon, to the bevel gear 17ª on the intermediate shaft 17, and from there to said intermediate shaft, and the work may be performed by the intermediate shaft 17.

In the above three examples the advantage attained consists in the utilization of the reaction incident to the change of speed from the driving member to the driven member to virtually assist the driving member in driving the driven member, and reduce the loss of energy usually involved in performing the work at such speed, so that the efficiency of operation may remain more constant at all speeds and under all conditions.

It will be understood that no energy is gained, contrary to the law of conservation of energy; but all of the energy applied in driving is transmitted in the form of kinetic energy to the driven element. The force expended against the foundation fastenings of the machine when a stationary reactive element is used, is here transmitted to the work, and the exertion upon the fastenings of the machine is reduced to that transmitted thereto due to the friction in the bearings of the machine—a negligible quantity in any machine with well designed bearings. In any machine where the work must be done at a considerably higher speed than that at which the driving force is applied, the loss in the form of potential energy, with a stationary reactive element, is of high percentage. As the ratio of speed increase from driving to driven element rises, the percentage of loss of energy expended potentially on a stationary reactive element increases far faster than does the increase in speed ratio. I dispense with this potential energy loss, with the result that the work done is directly proportional to the energy expended at any ratio of speed increase from driving to driven element, instead of indirectly and varyingly proportional as with a stationary reactive element. The unavoidable friction, of course, is present; but this factor remains the same in either case, and has no bearing on the comparison of my invention with the commonly used principles of machine design. It is with the avoidance of energy loss from high ratios of speed increase from driving to driven element that my invention is directly concerned.

A more elaborate construction permitting of a high increase in speed of the driven shaft over that of the driving shaft, and allowing of several changes in the speed, is illustrated in Fig. 4, in which the driven shaft 21 has a bearing 21′ at one end, and has a bearing 21″ at the other end inside the driving shaft 22 which has a bearing 22′. The reactive member or drum 23 has a bearing at one end of the driving shaft 21 and at the other end and on the driven shaft 22, and carries a series of stepped gears 24 and 24ª on one side, and a series of similar gears 24′ and 24ª′ on the other side loosely mounted on shafts 24″ and 24‴, respectively, which are rigidly mounted in said drum and are parallel to the driving shaft and driven shaft and equally spaced radially from the center line thereof. The driving gear 21ª and a series of stepped gears 25, 25ª and 25ᵇ, are mounted on the driving shaft 21, and any of them may be rigidly attached thereto by means of set screws 26, which, when loosened, allow the gear to turn on the shaft. The stepped gears on the driving shaft are intermeshed with the similar gears on the shafts 24″ and 24‴ in such a manner as to form a train of gears from the driving gear 21$^a$ to the driven gear 22$^a$, which is integral with the driven shaft 22 around the driving shaft 21, and which meshes with the larger member on the last stepped gear 24$^a$. This driving shaft 22 is also provided with a set screw 26′ so that it may be tightened upon the driving shaft 21 and driven at the same speed as the driving shaft when desired.

It will be understood when any one of the set screws 26 or the set screw 26′ is tightened all the other screws must be loosened. An intermediate shaft 27 is journaled parallel with the driving shaft and the driven shaft in bearings 27″ and the pinion 27$^a$ is rigidly mounted thereon by means of set screws 27$^{a\prime}$. The reactive member or drum 23 has a gear 23$^a$ formed integral therewith concentric to the driving shaft and driven shaft on which the drum rotates, and this gear is in mesh with the pinion 27$^a$ on the intermediate shaft 27. Two other gears 27$^b$ and 27$^c$ are mounted on the intermediate shaft 27 and provided with set screws 27$^{b\prime}$ and 27$^{c\prime}$ respectively, so that either of them may be tightened upon the intermediate shaft to rotate therewith. A gear 21$^b$ is mounted on the driving shaft adjacent to the bearing 21′ thereof, and provided with a set screw 21$^{b\prime}$ so that it may be tightened upon the driving shaft, and this gear 21$^b$ is in mesh with the gear 27$^b$ on the intermediate shaft. A gear 22$^b$ is mounted on the driven shaft and provided with a set screw 22$^{b\prime}$ so that it may be tightened upon said driven shaft, and this gear is in mesh with the other gear 27$^c$ on the intermediate shaft. The driven shaft 22 is provided with a reduced portion 22$^c$ upon which a suitable operative member may be mounted to perform work while the driving shaft 21 has a pulley 21$^c$ by means of which it may be driven by any suitable motive apparatus.

It will be readily understood that the above described device combines the features of the devices illustrated in Figs. 1 and 2, allowing the reaction to be utilized either directly upon the driven shaft or upon the driving shaft, to assist said driving shaft in driving the driven shaft, with the advantages and with the details of operation described in connection with the former devices.

The facility with which high speeds may be obtained without decreasing the efficiency with which the machine may be operated renders my invention specially applicable to all forms of hand driven machines where a high operating speed is desirable, such as the grinding machine illustrated in Fig. 5. Here the driving shaft 31 has a bearing 31′ near one end and a bearing 31″ in the driving shaft 32 at the other end, which driven shaft has a bearing 32′. The reactive member or drum 33 carries the stepped gears 34 on reactive shafts 34′ so arranged and designed that the parts balance each other, and three other stepped gears 35 are provided on the driving shaft 31 to intermesh with the various gears 34 and form a train between the driving gear 31$^a$ on the driving shaft and the driven gear 32$^a$ that is integral with the driven shaft 32. A gear 31$^b$ is rigidly mounted on the driving shaft 31 along with the driving gear 31$^a$ by means of a cotter 36 taking through sleeves 31$^{a\prime}$ and 31$^{b\prime}$ with which said gears are provided, respectively, the driving gear 31$^a$ of course being inside the drum 33, while the gear 31$^b$ is outside the drum. A tap screw 37 is secured in the frame 38 of the machine and forms a bearing for an integrally formed pinion 37$^a$ and gear 37$^b$. The gear 37$^b$ is in mesh with the gear 31$^b$ and is of diameter equal therewith, while the pinion 37$^a$ is in mesh with the gear 33$^a$ that is formed integral with the drum 33. The driving shaft 31 is provided with a suitable handle 31$^c$ and the grinding wheel 32$^c$ is mounted on the driven shaft 32 in a well known manner. The frame 38 of the machine is provided with a clamping device 38$^a$, by means of which it may be secured to a bench or table 39 as is well understood.

In the lathe illustrated in Fig. 6 the spindle is divided into two parts, so as to comprise the hollow driving shaft 41 and the hollow driven shaft 42. The reactive member here consists of two gears 43 spaced apart to allow room for the planetary stepped gears 44 and the stepped gears 45 mounted on the driving shaft 41. The reactive shafts 44′ rigidly secure the gears 43 together. The various gears 44 and 45 form speed-varying connection between the driving gear 41$^a$ and the driven gear 42$^a$ which are adapted to be rigidly secured to the driving shaft 41 and driven shaft 42, respectively, by means of set screws 46. The various stepped gears 45 on the driving shaft are also detachably secured thereto by set screws 46′ so that by tightening any one of said set screws and loosening all the others, different speed variations may be obtained between the driving shaft 41 and the driven shaft 42. The intermediate shaft 47 carries pinions 47$^b$ rigidly mounted thereon and in mesh with the gears 43 that form the reactive member. The gear 41$^b$ is mounted on the driving shaft 41 and a gear 47$^b$ is mounted on the intermediate shaft 47 in mesh with the gear 41$^b$ and of equal diameter therewith. The gear 42^b is mounted on the driven shaft 42 and another gear 47^c is mounted on the intermediate shaft 47 in mesh with the gear 42^b and of equal diameter therewith. Any of these gears may be rigidly secured to its shaft by means of set screws 46''. As here shown, the driving shaft 41 has a pulley 41^c by means of which it may be rotated from any suitable motive apparatus, and the driven shaft 42 has a tapered opening to receive a suitable operative member such as the center 42^c. It will be readily seen that a large number of different speeds may be obtained on a lathe thus equipped with my invention by merely manipulating the set screws, and all such speeds will be obtained with uniform efficiency.

In the drill illustrated in Fig. 7 the driven shaft 51 has bearings 51' in the column of the drill and also a bearing 51'' in the region adjacent to its end. The driven shaft here takes the form of a sleeve 52 integral with which is formed the driven gear 52^a. The reactive member consists in the two gears 53 carrying the two stepped gears 54, on reactive shafts 54'. The driving gear 51^a is operatively connected, through these gears 54 and the stepped gear 55 mounted on the driving shaft 51, with the driven gear 52^a. By means of set screws 56 either the driven gear 51^a or the gear 55 may be rigidly secured to the driving shaft 51, so that two different speeds may be transmitted to the driven gear 52^a. The intermediate shaft 57 has bearings 57' and carries pinions 57^a which are in mesh with the reactive gears 53. It also carries a gear 57^b and gear 52^b is rigidly mounted on the driven shaft or sleeve 52. The gears 52^b and 57^b mesh together and are of equal diameter. One of the gears 53 has a sleeve 53^a surrounding and forming the bearing 51'' for the driving shaft 51 and this sleeve 53^a carries a bevel gear 53^b rigidly secured thereon. The intermediate shaft 57 carries a bevel gear 57^c rigidly secured thereon in vertical alinement with the gear 53^a. The spindle 58 on the drill has a bevel gear 58^a in mesh with the gear 53^a below, and a bevel gear 58^b is in mesh with said gear 53^a above, either of which may be made to impart their rotation received from the bevel gear 53^a to said spindle 58 by means of a clutch 59. It will thus be seen that the direction of rotation of the spindle may be reversed without reversing the driving mechanism. Another bevel gear 58^c, on said spindle 58, is in mesh with the bevel gear 57^c on the intermediate shaft 57, and this gear may also be thrown into engagement with the spindle 58 by means of the lever 59. The pulleys 51^c are mounted on the driving shaft 51 for applying and controlling the application of suitable motive power to the machine. It will be noted that in this instance the speed is reduced from the driving shaft to the spindle 58 and it will be understood that this reduction is accomplished with efficiency equal to that attained when the speed is increased.

In the light drill illustrated in Fig. 8 the driving shaft 61 has a bearing 61' near one end, and has a bearing 61'' inside the driving shaft or sleeve 62 at the other end. The reactive gears 63 carry the stepped gears 64 on reactive shafts 64' and a stepped gear 65 on the driven shaft 61 forms, together with the gear 64, operative connecting means between the driving gear 61^a on the driving shaft and the driven gear 62^a which forms part of the driven sleeve 62. By means of set screws 66', either the driving gear 61^a or the gear 65 may be rigidly secured to the driving shaft, so that a change of speed may be obtained. The intermediate shaft 67 carries pinions 67^a in mesh with the reactive gears 63. The spindle 68 on the drill is provided with bevel gears 68^a and 68^b rigidly mounted thereon and a bevel pinion 61^b is rigidly mounted on the driven sleeve 62 with the bevel gear 68^a in mesh therewith. The bevel gear 68^b meshes with the bevel pinion 67^b rigidly mounted on the intermediate shaft 67. The driving shaft 61 has a suitable handle 61^c for driving the machine, and the intermediate shaft 67 is provided with a fly wheel to regulate the speed thereof. The spindle 68 is fed downward by means of an automatic feed 69 comprising a bracket 69^a embracing the spindle 68 and running on a vertical screw 69^b which carries at its upper end rigidly secured thereto a ratchet wheel 69^c actuated by a pawl 69^c' carried on a bar 69^d that oscillates with a lever 69^d' that is oscillated by means of a cam 67^d rigidly mounted on the intermediate shaft 67. The bar 69^d is supported forwardly by means of a link 69^d''. In this instance it will be seen that the action is transmitted from the driving wheel 61^a through the train of gears to the driven sleeve 62 and from there through the pinion 61^b and gear 68^a to the drill spindle 68, while the reaction is transmitted from the gears 64, carried on the reactive member 63, through the intermediate shaft 67 by means of its pinion 67^a, and its bevel pinion 67^b and through the bevel gear 68^b to the drill spindle 68, with the advantages hereinbefore mentioned.

In the mowing machine illustrated in Fig. 9 the driving shaft is the axle 71 of the machine and the driven shaft or sleeve 72 turns on this axle 71. The reactive gears 73 carry the stepped gears 74 on reactive shafts 74', and these gears together with the stepped gears 74, which also turn on the axle 71, constitute the speed-varying operative connection between the driving gear 71^a, which is rigidly secured to the axle 71, and the driven gear 72ª. By means of set screws 76, either the driven gear 71 or the gear 75, adjacent thereto, may be readily secured to the axle 71, so that a change of speed may be effected for operating the cutter bars slower or faster in accordance with the character of the work to be done. The intermediate shaft 77 has pinions 77ª in mesh with the reactive gears 73, and also has a gear 77ᵇ rigidly mounted thereon in mesh with and of diameter equal to that of the gear 71ᵇ rigidly mounted on the axle 71. The driven sleeve 72 carries a bevel gear 72ᵇ. The connecting shaft 78 of the machine is journaled at right angles to the axle, and has a bevel gear 78ª rigidly mounted thereon in mesh with the bevel gear 72ᵇ and of diameter equal therewith. This connecting shaft 78 carries the disk 79 which, through the pitman 79ª, operates the cutter bar 79ᵇ.

The lawn mower illustrated in Fig. 10 is similar in construction to the mowing machine, in that the axle 81 thereof is the driving shaft of the mechanism. The driven shaft is here replaced simply by the driven gear 82ª and the gear 82ᵇ rigidly secured together, and the reactive member takes the form of a shell 83 carrying the stepped gears 84 on reactive studs 84'. The stepped gear 85 on the axle 81 completes, with the gears 84, the operative connection between the driving gear 81ª, rigidly secured to the axle 81 by a cotter 86, and the driven gear 82ª. The spindle 87 for the cutting reel 88 carries, rigidly attached thereto, a pinion 87' which is in mesh with a pinion 87ª mounted on a stud 87ª' and in mesh with a gear 83ª formed on the outside of the reactive member 83. Rigidly secured to the pinion 87ª, and preferably integral therewith is the gear 87ᵇ which is in mesh with the gear 82ᵇ and of diameter equal thereto. It will be seen in this instance that the action and reaction both operate directly upon the intermediate shaft with which the work is performed.

In the modification illustrated in Fig. 13, the various parts are simply duplicated, so that the cutting wheel 88 is driven from both sides of the mower, and the various parts, being operated in accordance with the illustration contained in Figs. 10 to 12 inclusive, need not be further described.

In the blower illustrated in Fig. 14, the driving shaft 91 has a bearing 91' at one end and a bearing 91" at the other end in the driven shaft 92 which has an opening 92' therefor. The reactive member or drum 93 carries the stepped gears 94 on reactive shafts 94', and stepped gears 95 turning on the driving shaft 91 complete the operative connection between the driving gear 91ª, which is keyed to the driving shaft 91, and the driven gear 92ª on the driven shaft 92 which is provided with a suitable ball bearing 96. The intermediate stud 97 forms a bearing for a gear 97ª in mesh with the gear 93ª that is rigidly mounted on a sleeve of the drum 93, and this gear 97ª is formed integral with a gear 97ᵇ that is in mesh with the gear 91ᵇ rigidly mounted on the driving shaft 91, the diameters of said gears being equal. The driving shaft 91 is provided with a handle 91ᶜ for operating the blower and the fan blades 98 are rigidly mounted on the driving shaft 92 within the casing 99 which has a central inlet 99ª and a peripheral outlet 99ᵇ.

In the cream separator illustrated in Fig. 15 the driving shaft 101 is vertical and hollow, and the driven shaft 102 extends therethrough. The driving shaft 101 is supported on a large ball 101" at its lower end, while the driven shaft 102 is supported on a smaller ball 102' within the lower end of the driving shaft 101. The drum 103 carries the stepped gears 104 on reactive shafts 104', and a series of stepped gears 105 on the driving shaft 101 complete, together with the gears 104, the operative connection between the driving gear 101ª and the driven gear 102ª. The hub of the driving gear 101ª is elongated and it is attached to the driving shaft by a long key 106. The intermediate stud 107 forms a bearing for the gear 107ª and the gear 107ᵇ, integrally formed. The gear 107ª meshes with gear 103ª mounted on the end of the drum 103, this gear being twice the diameter of the gear 107ª. The gear 107ᵇ meshes with the gear 101ᵇ mounted together with the gear 101ª on the driving shaft 101 and the gear 107ᵇ and gear 101ᵇ are equal in diameter. The driven shaft 102 carries the bowl 108 of the cream separator, which, together with other parts of said machine, being of well known construction, need not be further referred to. A large bevel gear 101ᶜ is rigidly attached to the driving shaft 101 within the casing of the machine, and another bevel gear 101ᵈ, of diameter equal therewith, is mounted on a horizontal shaft 101ᵉ and meshes with the bevel gear 101ᶜ, so that when the shaft 101ᵉ is turned by a crank 101ᵉ' at a speed convenient for manual operation, a very high speed is imparted to the bowl 108, as is required in machines of this character. My invention is especially applicable to cream separators where a very high increase of speed is required, and where such an increase with the use of forms of gearing heretofore disclosed results in a ruinous loss of energy, and requires the utmost exertion for operation.

In the boat illustrated in Fig. 17 the engine 110 has its crank shaft 111 elongated to form the driving shaft of the device, and this driving shaft extends through the driven sleeve 112 and receives the driving gear 111ᵃ, on the other side of this driven sleeve 112 from the engine 110, or source of power. The drum 113 carries the stepped gears 114 on reactive shafts 114′ and a stepped gear 115 mounted on the driving shaft 111 completes the operative connection between the driving gear 111ᵃ and the driven gear 112ᵃ, which is integral with the driven sleeve 112. The driving gear 111ᵃ is rigidly secured to the crank shaft by means of a key 116. The intermediate shaft here takes the form of the propeller shaft 117, and is inclined downwardly aft, passing through the bottom of the boat in a well known manner. This propeller shaft 117 carries the bevel gear 117ᵃ rigidly secured thereon and in mesh with the bevel gear 113ᵃ formed on the outside of the drum 113. Another bevel gear 117ᵇ, rigidly mounted on the propeller shaft 117, meshes with the bevel gear 112ᵇ that is rigidly mounted on the driven sleeve 112 and is of diameter equal therewith. The propeller 118 is mounted on the propeller shaft 117 in the usual well-known manner. It will be seen that here the action and reaction are both transmitted directly to the propeller shaft 117 with which the work is performed, and in addition to operating said propeller shaft at a higher speed than that of the engine without decreasing the efficiency of operation, the direction of transmission of power is also changed, allowing the engine 110 to be mounted horizontally in connection with the inclined propeller shaft without the use of a universal joint or other contrivance other than that used incident to the application of my invention.

In the dynamo electric machine illustrated in Fig. 19, the driving shaft 121 has a bearing 121′ at one end and a bearing 121″ in the driven shaft 122 at the other end. This driven shaft 122 is the armature shaft of the dynamo and has a bearing 122′ at one end and a bearing 122″ at the other end in the reactive member or drum 123 which has a sleeve 123′ with an outside bearing 123″. This drum 123 carries the stepped gears 124 on reactive shafts 124′, and a stepped gear 125 mounted on the driving shaft 121 completes, with these gears 124, the operative connection between the driving gear 121ᵃ and the driven gear 122ᵃ. The gear 125 has a set screw 126 by means of which it may be attached to the driving shaft 121, and the driving gear 121ᵃ is attached to the driving shaft 121 by means of a set screw 126′. The intermediate stud 127 forms the bearing for the integrally formed gears 127ᵃ and 127ᵇ. The gear 127ᵃ is in mesh with the gear 123ᵃ that is rigidly mounted on the drum 123, and this gear 127ᵃ is of half the diameter of the gear 123ᵃ. The gear 127ᵇ is in mesh with the gear 121ᵇ rigidly mounted on the driving shaft 121, and this gear 127ᵇ is of diameter equal with the gear 121ᵇ. The driving shaft 121 is provided with a suitable coupling 121ᶜ by means of which it may be coupled to a suitable motive apparatus such as an explosive engine. The armature 128 is carried on the driven shaft or armature shaft 122, while the field coils 129 of the dynamo are mounted on their cores which are carried by the drum 123 and rotate therewith. The current is taken from the armature by means of a suitable commutator 128ᵃ and brushes 128ᵃ′ and conducted outside the machine to suitable collector rings 129ᵃ upon which bear brushes 129ᵃ′ herein diagrammatically represented for the sake of simplicity in illustration. The field coils receive their current through conductors 129ᵇ connected to the brushes 128ᵃ′. It will be seen that in this instance the reaction is utilized through the operative connection of the reactive member or drum 123 with the driving or armature shaft 122 through the gears, and it is also utilized in the form of magnetic attraction or the field of force existing between the field coils and the armature. By tightening either the set screw 126 or the set screw 126′ a change of ratio may be effected, allowing the speed of the motive apparatus to be varied while the voltage of the dynamo may remain within the limits for which it is designated.

My invention is especially applicable to machines of this character where it is desired to operate such machines of moderate size with the use of explosive engines, and where it is desired to raise the speed considerably above that of the engine without losing in efficiency of operation, as is the case in connection with all forms of speed transmission heretofore employed in such work. It may be noted that the field and armature both rotate in the same direction, the armature rotating much more rapidly than does the field, and it will be understood that the armature and field are so wound that the same voltage is attained in connection with this operation as would be attained in connection with a machine operated with its fields fixed.

From the foregoing examples it will be readily understood that my invention introduces a new principle into the field of dynamics, affording a marked improvement over the known principles in the art. By providing and rendering available all the energy which was heretofore divided into potential and kinetic energy, and utilizing all of this energy in the form of kinetic energy the power which heretofore has been wasted in the operation of the machines is conserved and the maximum efficiency attained. It will therefore be understood that the field for application of this new principle is by no means limited to that represented by the few examples herein set forth, but extends to all forms of locomotion, as well as to all contrivances for doing work in the form of setting bodies into motion and continuing them in motion, as well as utilizing the energy of moving bodies to perform work. In such class of machines as that represented by the grinder, the light drill, the mowing machine, the lawn mower, the blower, the cream separator, and the electric machine, my invention is especially desirable in that it affords a high increase in speed without loss in efficiency, while in such machines as the lathe and the heavy drill press, as well as in motor vehicles and other contrivances where it is desired to vary the speeds between the limits allowed, this variation may be accomplished with the greatest convenience, not necessarily depending upon the use of set screws as herein illustrated, but permitting the use of clutches of any well known design for operatively engaging the various gears with the driving shaft to effect the different changes in speed. It may also be used in connecting with sliding gear change speed contrivances as will be readily understood by those skilled in the art. By permitting the use of what is herein termed the driving shaft and also of the intermediate shaft for performing work, a large number of adaptations in design are possible with the use of this new principle.

Having fully described the principle of my invention, and exemplified it by certain devices specifically illustrated and described it will therefore be understood that I do not limit myself to such specific illustrations and descriptions, but

What I claim as new and desire to secure by Letters Patent is:

1. In a mechanical movement, the combination of a driving shaft, a driven shaft concentric thereto, a reactive member concentric to both of them, gears carried by the reactive member, and gears meshing therewith and forming speed-varying connections between the driving shaft and the driven shaft, an intermediate shaft parallel with the driving shaft and the driven shaft, a gear rotatable with the reactive member, a gear rotatable with the intermediate shaft and in mesh with the gear rotatable with the reactive member, another gear rotatable with the intermediate shaft, and means for alternatively connecting said intermediate shaft operatively with said driving shaft or with said driven shaft through one or the other of the gears on the intermediate shaft, whereby the reaction of said operative connection between the two shafts is utilized to assist in driving one or the other of said shafts.

2. In a mechanical movement, the combination of two concentric shafts, a reactive member concentric to both of the shafts, gears carried by the reactive member and forming speed-varying connections between the two shafts, an intermediate shaft, an operative connection between the reactive member and the intermediate shaft, and operative connection between the intermediate shaft and one of the shafts that are connected by the speed-varying connection, whereby the reaction of said speed-varying connection is utilized to assist in driving said one of the shafts.

3. In a mechanical movement, the combination of a driving shaft, a driven shaft concentric thereto, a reactive member rotatable concentric to both of them, gears carried by the reactive member and forming speed-varying connection between the driving shaft and the driven shaft, an intermediate shaft parallel with the driving shaft and the driven shaft, a gear rotatable with the reactive member, a gear rotatable with the intermediate shaft and in mesh with the gear rotatable with the reactive member, another gear rotatable with the intermediate shaft, and a gear rotatable with the driven shaft and in mesh with the gear rotatable with said other gear on the intermediate shaft, whereby the reaction of the operative connection between the two shafts is utilized to assist in driving the driven shaft.

4. In a mechanical movement, the combination of a driving shaft, a driven shaft concentric thereto, a reactive member rotatable concentric with both of them, gears carried by the reactive member and forming speed-varying connection between the driving shaft and the driven shaft, an intermediate shaft parallel with the driving shaft and the driven shaft, a gear rotatable with the reactive member, a gear rotatable with the intermediate shaft and in mesh with the gear rotatable with the reactive member, another gear rotatable with the intermediate shaft, and a gear rotatable with the driven shaft and in mesh with the gear rotatable with said other gear on the intermediate shaft, whereby the reaction of the operative connection between the two shafts is utilized to assist in driving the driven shaft; and means whereby the ratio of change of speed of said operative connection, as transmitted therethrough from the driving shaft to the driven shaft, is changed.

5. In a mechanical movement, the combination of a driving shaft, a driven shaft concentric thereto, a reactive member rotatable concentric with both of them, gears carried by the reactive member and forming speed-varying connection between the driving shaft and the driven shaft, an intermediate shaft parallel with the driving shaft and the driven shaft, a gear rotatable with the reactive member, a gear rotatable with the intermediate shaft and in mesh with the gear rotatable with the reactive member, another gear rotatable with the intermediate shaft and a gear rotatable with the driven shaft and in mesh with the gear rotatable with said other gear on the intermediate shaft, whereby the reaction of the operative connection between the two shafts is utilized to assist in driving the driven shaft, a third gear on the intermediate shaft, a gear to rotate with the driving shaft in mesh with said third gear on the intermediate shaft, and means whereby the second mentioned gear on the intermediate shaft may be rendered inoperative upon said driving shaft and whereby said third gear on the intermediate shaft may be caused to rotate with the intermediate shaft and utilize said reaction to assist the driving shaft.

6. In a mechanical movement, the combination of a driving shaft, a driven shaft concentric thereto, a reactive member rotatable concentric with both of them, gears carried by the reactive member and forming speed-varying connection between the driving shaft and the driven shaft, an intermediate shaft parallel with the driving shaft and the driven shaft, a gear rotatable with the reactive member, a gear rotatable with the intermediate shaft and in mesh with the gear rotatable with the reactive member, another gear rotatable with the intermediate shaft, and a gear rotatable with the driven shaft, and in mesh with said other gear on the intermediate shaft, whereby the reaction of the operative connection between the two shafts is utilized to assist in driving the driven shaft, a third gear on the intermediate shaft, a gear to rotate with the driving shaft in mesh with said third gear on the intermediate shaft, means whereby the second mentioned gear on the intermediate shaft may be rendered inoperative upon said driving shaft and whereby said third gear on the intermediate shaft may be caused to rotate with the intermediate shaft and utilize said reaction to assist the driving shaft, and means whereby the ratio of change of speed of said operative connection, as transmitted therethrough from the driving shaft to the driven shaft, is changed.

7. In a mechanical movement the combination of a driving shaft, a driven shaft concentric thereto, a reactive member concentric to both of them, two shafts mounted in the reactive member parallel to and at equal distances radially from the common center line of the driving shaft and the driven shaft, a gear on the driving shaft, a gear on the driven shaft, a stepped gear on one of said shafts in the reactive member, in mesh with the gear of the driving shaft, a stepped gear on the other of said shafts in the reactive member, in mesh with the gear on the driven shaft, a stepped gear concentric with the driving shaft and the driven shaft and in mesh with said stepped gears on said shafts in the reactive member, whereby a train of gears comprising speed-varying connection between said driving shaft and said driven shaft is formed, said gears on the shafts in the reactive member reacting upon said member, and producing rotation thereof, a gear on said reacting member, an intermediate shaft, a gear on the intermediate shaft in mesh with the gear on the reactive member, whereby the intermediate shaft is rotated, and means for utilizing the rotation on the intermediate shaft, substantially as and for the purposes specified.

8. In a mechanical movement the combination of a driving shaft, a driven shaft concentric thereto, a reactive member concentric to both of them, two shafts mounted in the reactive member parallel to and at equal distances radially from the common center line of the driving shaft and the driven shaft, a gear on the driving shaft, a gear on the driven shaft, a stepped gear on one of said shafts in the reactive member, in mesh with the gear of the driving shaft, a stepped bear on the other of said shafts in the reactive member in mesh with the gear on the driven shaft, a stepped gear concentric with the driving shaft and the driven shaft, and in mesh with said stepped gears on said shafts in the reactive member, whereby a train of gears constituting speed-varying connection between said driving shaft and said driven shaft is formed, said gears on the shafts in the reactive member reacting upon said member, and producing rotation thereof, a gear on said reactive member, an intermediate shaft, a gear on the intermediate shaft in mesh with the gear on the reactive member, whereby the intermediate shaft is rotated, means for utilizing the rotation of the intermediate shaft, and means for rendering one of said gears in said train, forming the speed-varying connection, inoperative, whereby the ratio of change of speed of said connection, as transmitted from said driving shaft to said driven shaft, is changed.

9. A mechanical movement for changing energy from one form to another, consisting of a plurality of members rotating to pass in spaces progressively varying in location around a circle of and through a cycle of operation.

10. A mechanical movement for changing energy from one form to another, consisting of a plurality of members rotating to pass in the same direction but in spaces progressively varying in location around a circle of and through a cycle of operation.

11. A mechanical movement for changing energy from one form to another in substantially uniform proportion at varying speed ratios, consisting of a plurality of members rotating to pass in spaces progressively varying in location around a circle of and through a cycle of operation.

12. A mechanical movement for changing energy from one form to another in substantially uniform proportion at varying speed ratios, consisting of a plurality of members rotating in the same direction but passing in spaces progressively varying in location around a circle of and through a cycle of operation.

ALPHEUS FAY.

Witnesses:
  CLARENCE PEIDEN,
  CHAS. F. TURBEE.